United States Patent
Cho et al.

(10) Patent No.: US 8,985,605 B2
(45) Date of Patent: Mar. 24, 2015

(54) REAR SHOCK ABSORBER MOUNTING STRUCTURE FOR VEHICLE

(71) Applicant: Hyundai Motor Company, Seoul (KR)

(72) Inventors: Sung Hoon Cho, Bucheon-si (KR); Dae Seung Kim, Gwacheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/095,577

(22) Filed: Dec. 3, 2013

(65) Prior Publication Data
US 2014/0375012 A1    Dec. 25, 2014

(30) Foreign Application Priority Data
Jun. 19, 2013 (KR) .................. 10-2013-0070455

(51) Int. Cl.
*B60G 15/02* (2006.01)
*B60G 13/00* (2006.01)

(52) U.S. Cl.
CPC .................................. *B60G 13/003* (2013.01)
USPC ...... 280/124.155; 280/124.145; 280/124.146; 296/198; 296/203.04; 296/203.01; 296/204

(58) Field of Classification Search
CPC ............. B60G 15/067; B60G 15/068; B60G 2204/128; B60G 13/003; B60G 3/202; B62D 25/088; B62D 25/2027; B62D 25/16
USPC .................... 280/124.109, 124.146, 124.149, 280/124.154, 124.155, 124.112, 124.145; 296/198, 203.04, 203.01, 204, 30
See application file for complete search history.

(56) References Cited

U.S. PATENT DOCUMENTS

| | | | | |
|---|---|---|---|---|
| 2,611,625 A * | 9/1952 | Kishline et al. | ......... | 280/124.109 |
| 2,718,409 A * | 9/1955 | Kishline et al. | ............... | 280/788 |
| 3,202,451 A * | 8/1965 | Auger et al. | .................. | 296/204 |
| 5,431,363 A * | 7/1995 | Ezzat et al. | ................. | 248/205.1 |
| 6,464,239 B1 * | 10/2002 | Kim | ........................ | 280/124.147 |
| 6,648,401 B2 * | 11/2003 | Behnke et al. | ................ | 296/198 |
| 2004/0051292 A1* | 3/2004 | Tamura | ......................... | 280/781 |
| 2009/0058032 A1* | 3/2009 | Croyle et al. | .......... | 280/124.155 |
| 2010/0078970 A1* | 4/2010 | Kim | .............................. | 296/198 |
| 2011/0156447 A1* | 6/2011 | Matsuoka et al. | ....... | 296/203.04 |
| 2012/0138757 A1* | 6/2012 | Hong et al. | ................ | 248/205.1 |
| 2013/0082482 A1* | 4/2013 | Kim | ............................. | 296/198 |

FOREIGN PATENT DOCUMENTS

| | | |
|---|---|---|
| JP | 64-21074 U | 2/1989 |
| JP | 7-165119 | 6/1995 |
| JP | 2006-15800 A | 1/2006 |
| JP | 2006-182081 B2 | 7/2006 |
| JP | 2013-043474 A | 3/2013 |
| KR | 1020030039754 A | 5/2003 |

* cited by examiner

*Primary Examiner* — Ruth Ilan
*Assistant Examiner* — Darlene P Condra
(74) *Attorney, Agent, or Firm* — Morgan, Lewis & Bockius LLP

(57) ABSTRACT

A rear shock absorber mounting structure for a vehicle includes a rear shock absorber upper cover which may be mounted on a wheel housing and on which a rear shock absorber may be engaged and supported, an inner dual rail member which may be mounted on an inner surface of the wheel housing, which may be oriented toward a vehicle interior along a width direction of a vehicle, and an outer dual rail member which may be mounted on an outer surface of the wheel housing, which may be oriented toward an outside of the vehicle interior along the width direction of the vehicle, and thereby, the rear shock absorber mounting structure may be configured by a simple structure, and mounting stiffness of the rear shock absorber may be increased.

19 Claims, 9 Drawing Sheets

REAR SHOCK ABSORBER MOUNTING STRUCTURE FOR VEHICLE

CROSS-REFERENCE TO RELATED APPLICATION

The present application claims priority to Korean Patent Application No. 10-2013-0070455 filed on Jun. 19, 2013, the entire contents of which is incorporated herein for all purposes by this reference.

BACKGROUND OF THE INVENTION

1. Field of the Invention

The present invention relates to a rear shock absorber mounting structure for a vehicle, and more particularly, to a rear shock absorber mounting structure for a vehicle, capable of improving productivity and reducing weight by reducing the number of components and manufacturing processes.

2. Description of Related Art

In general, a suspension system of a vehicle refers to an apparatus which connects a vehicle body and an axle, and controls vibration or impact that the axle receives from a road surface when the vehicle travels so as not to be directly transmitted to the vehicle body, thereby preventing the vehicle body and freight from being damaged and making ride comfortable. The suspension system includes a chassis spring which mitigates impact from the road surface, a shock absorber which controls free vibration of the chassis spring so as to make ride comfortable, and a stabilizer which suppresses rolling motion of the vehicle body.

While a lower portion of the shock absorber is typically connected to a wheel by a knuckle, or the like, an upper portion of the shock absorber is mounted on a wheel housing, which configures the vehicle body, and mainly serves to absorb and reduce vibration and impact that is transmitted to the vehicle body through the wheel.

A rear shock absorber, which is mounted on a rear wheel of the vehicle among the shock absorbers as described above, has an upper portion which is typically mounted on the wheel housing through a rear shock absorber cover.

The rear shock absorber cover serves to increase stiffness at a portion on which the wheel housing is mounted, and improve mounting and assembling performance of the rear shock absorber.

However, in the aforementioned mounting structure of the related art in which the rear shock absorber is mounted on the wheel housing through the rear shock absorber cover, there is a drawback in that because the rear shock absorber cover and a structure at a portion on which the rear shock absorber cover is mounted are configured by a plurality of panels and brackets such that the structure is complicated, mounting and assembling performance deteriorate, and stiffness at a vehicle body input point of the rear shock absorber is also degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear shock absorber mounting structure for a vehicle, capable of improving mounting and assembling productivity by reducing the number of manufacturing processes by reducing the number of components, achieving reduction in weight and cost, and obtaining an effect of smoothly distributing loads by increasing stiffness at vehicle body input point.

In an aspect of the present invention, a rear shock absorber mounting structure for a vehicle, may include a rear shock absorber upper cover which is mounted on a wheel housing and on which a rear shock absorber is engaged and supported, an inner dual rail member which is mounted on an inner surface of the wheel housing, which is oriented toward a vehicle interior along a width direction of a vehicle, and an outer dual rail member which is mounted on an outer surface of the wheel housing, which is oriented toward an outside of the vehicle interior along the width direction of the vehicle.

A part of a lower portion of the rear shock absorber upper cover may be inserted into the wheel housing, and attached to the wheel housing by a welding method.

A package tray cross member, which is formed to be extended along the width direction of the vehicle, may be seated on and coupled to the rear shock absorber upper cover.

The rear shock absorber upper cover may have a quadrangular box shape.

When the rear shock absorber upper cover is mounted on the wheel housing, the rear shock absorber upper cover may include a front surface which is positioned forward along a longitudinal direction of the vehicle, a rear surface which is positioned rearward along the longitudinal direction of the vehicle, an inner surface which is positioned inward to be oriented toward the vehicle interior along the width direction of the vehicle, an outer surface which is positioned outward from the vehicle interior along the width direction of the vehicle, and a connection surface which integrally connects the front surface, the rear surface, the inner surface, and the outer surface.

A seat flange, which may have a shape that is opened inward along the width direction of the vehicle to be oriented toward an inner side of the vehicle interior, may be formed at an upper portion of the inner surface along a height direction of the vehicle, and the package tray cross member may be seated on and coupled to the seat flange.

The seat flange may include a flat bottom surface, and side walls which vertically stand on both edges of the bottom surface, and face each other.

A coupling protruding portion, which protrudes inward to be oriented toward the vehicle interior along the width direction of the vehicle, may be formed at a lower portion of the inner surface along the height direction of the vehicle, and the inner dual rail member may be fitted with and coupled to the coupling protruding portion.

The coupling protruding portion may have a quadrangular box shape.

The coupling protruding portion may include an inner surface which protrudes inward to be oriented toward the vehicle interior along the width direction of the vehicle, and a front surface and a rear surface which are formed to be vertically extended outward from the vehicle interior at both edges of the inner surface along the width direction of the vehicle, in which the front surface is positioned forward along the longitudinal direction of the vehicle and the rear surface is positioned rearward along the longitudinal direction of the vehicle.

When the inner dual rail member is attached to the inner surface of the wheel housing, which is oriented toward the vehicle interior along the width direction of the vehicle, the inner dual rail member may include a first rail which is extended upward and downward in the height direction of the vehicle, a second rail which is formed to be integrally and obliquely extended forward from the first rail along the longitudinal direction of the vehicle, and flanges which are horizontally bent along edges of the first rail and the second rail, and attached to the inner surface of the wheel housing by a welding method.

The first rail and the second rail may form an acute angle.

The first rail and the second rail may be formed to be bent so as to may have a ' ⊏ ' shaped cross-section, respectively.

An extending portion may be integrally formed on the rear surface so as to be extended rearward along the longitudinal direction of the vehicle, the extending portion may include a first extending portion which is positioned at an upper portion thereof along the height direction of the vehicle, a second extending portion which is positioned at a lower portion thereof but lower than the position of the first extending portion along the height direction of the vehicle, and a stepped connection portion which connects the first extending portion and the second extending portion so that a stepped portion is interposed between the first extending portion and the second extending portion, and the upper portion of the rear shock absorber may be engaged with and mounted to the second extending portion.

The connection surface may include an upper connection surface which is positioned at an upper portion thereof along the height direction of the vehicle, a lower connection surface which is positioned at a lower portion thereof but lower than the position of the upper connection surface, and a stepped connection portion which connects the upper connection surface and the lower connection surface so that a stepped portion is interposed between the upper connection surface and the lower connection surface, and the upper portion of the rear shock absorber may be engaged with and mounted to the lower connection surface.

When the outer dual rail member is attached to the outer surface of the wheel housing, which is oriented toward an outside of the vehicle interior along the width direction of the vehicle, the outer dual rail member may include a first rail which is extended upward and downward in the height direction of the vehicle, a second rail which is formed to be integrally and obliquely extended forward from the first rail along the longitudinal direction of the vehicle, and flanges which are horizontally bent along edges of the first rail and the second rail, and attached to the outer surface of the wheel housing by a welding method.

The first rail and the second rail may form an acute angle.

The first rail and the second rail may be formed to be bent so as to may have a ' ⊏ ' shaped cross-section, respectively.

According to the rear shock absorber mounting structure for a vehicle according to the exemplary embodiment of the present invention, an upper portion of the rear shock absorber is mounted on the wheel housing by a shock absorber cover configured as a single body having an approximately quadrangular box shape, thereby improving assembly production by reducing the number of man-hour required to mounting the rear shock absorber.

In addition, because of the shock absorber cover configured as a single body, reduction in cost may be achieved by reducing the number of components, manufacturing processes, and weight thereof.

Further, the outer dual rail member and the inner dual rail member, which are formed to be extended in a height direction of the vehicle, respectively, are attached to the inner surface and the outer surface of the wheel housing along a width direction of the vehicle, below the mounting portion of the wheel housing on which the shock absorber is mounted, thereby more stably supporting the shock absorber by increasing stiffness of the wheel housing.

In addition, the exemplary embodiment of the present invention may increase stiffness at a vehicle body input point of the shock absorber by the outer dual rail member, the inner dual rail member, and the cover having a box shape, and further, may efficiently distribute a vertical load that is transmitted to a vehicle body through the shock absorber.

Moreover, stiffness of upward and downward connections, forward and rearward connections, and left and right connections on the basis of a mounting portion of the shock absorber is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
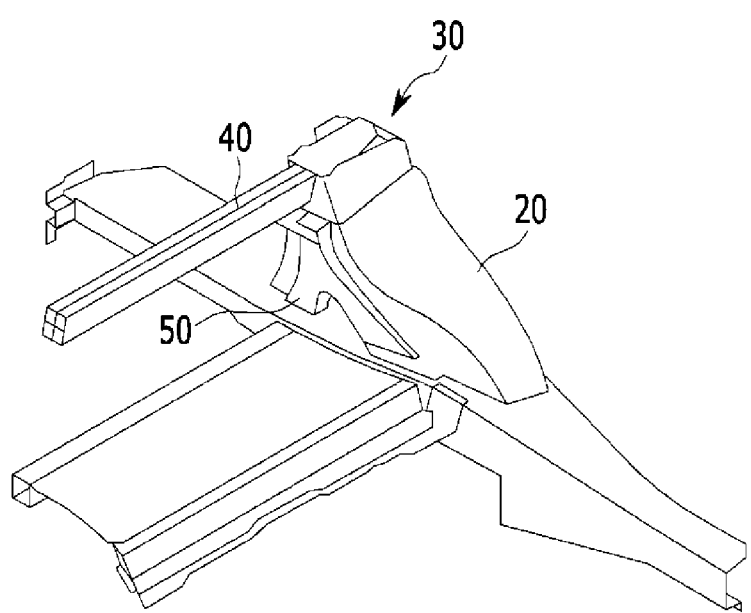
FIG. 1 is a perspective view of a rear shock absorber mounting structure for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s)

to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 5:
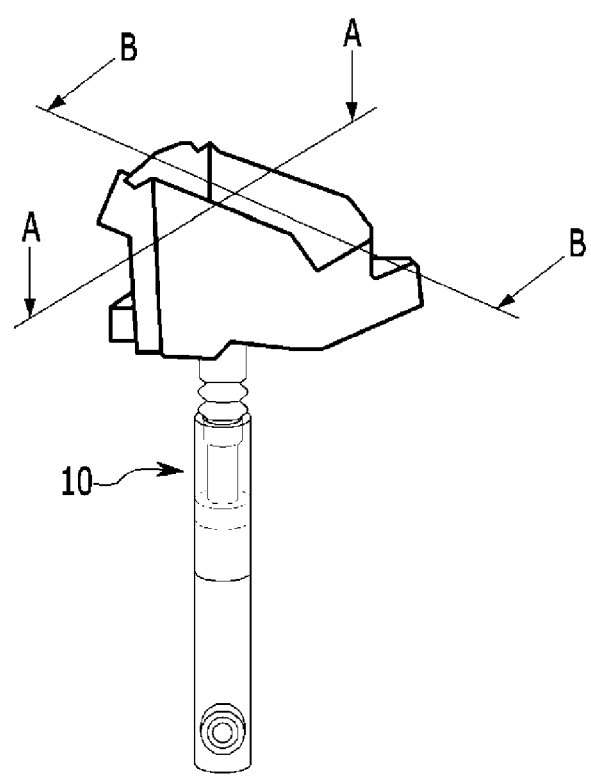
FIG. 5 is a perspective view illustrating a state in which a rear shock absorber is mounted on the rear shock absorber upper cover according to the exemplary embodiment of the present invention.

Referring to FIG. 1, a rear shock absorber mounting structure for a vehicle according to the exemplary embodiment of the present invention serves to stably mount a rear shock absorber 10, which is illustrated in FIG. 5, on a wheel housing 20 which configures a vehicle body.

A rear shock absorber upper cover 30 according to the exemplary embodiment of the present invention may be coupled and integrally attached to an upper portion of the wheel housing 20.

A part of a lower portion of the rear shock absorber upper cover 30 is inserted into the wheel housing 20, and for example, may be attached to the wheel housing 20 by a welding method.

The welding method may be performed as a spot welding method along an upper edge of the wheel housing 20, which is overlapped with a lower edge of the rear shock absorber upper cover 30, as illustrated in FIG. 1.

A package tray cross member 40, which is formed to be extended along a width direction of the vehicle, may be seated on and coupled to the rear shock absorber upper cover 30.

The package tray cross member 40 has an approximately quadrangular rod shape, but may have other shapes.

In an inner surface of the wheel housing, which is oriented toward a vehicle interior, that is, in an inner surface along the width direction of the vehicle, an inner dual rail member 50 according to the exemplary embodiment of the present invention is attached to a portion below a portion where the rear shock absorber upper cover 30 is mounted on the wheel housing 20 so as to serve to increase stiffness of the wheel housing, and also increase mounting stiffness of the rear shock absorber 10.

Figure 2:
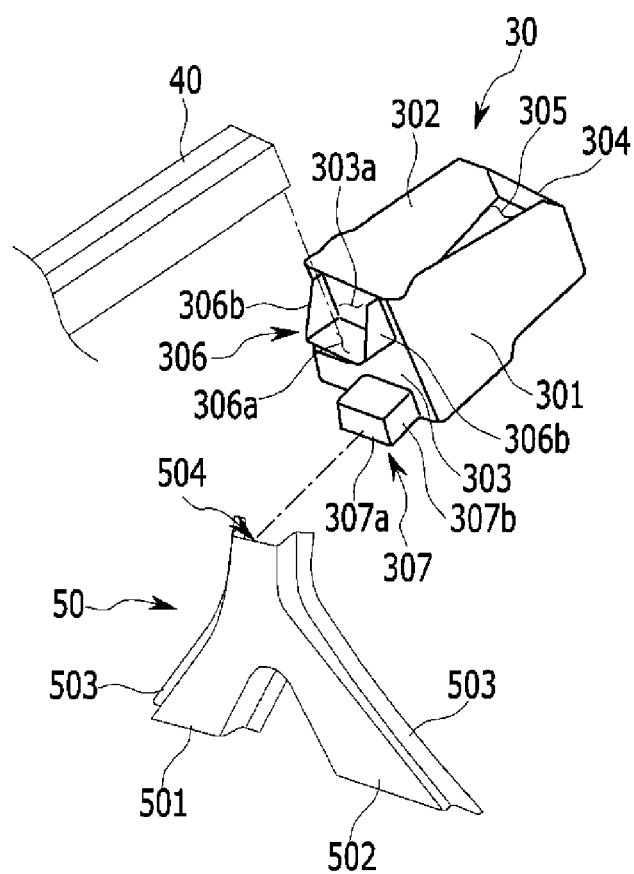
FIG. 2 is an exploded perspective view of a rear shock absorber upper cover, an inner dual rail member, and a package tray cross member according to the exemplary embodiment of the present invention.
Figure 3:
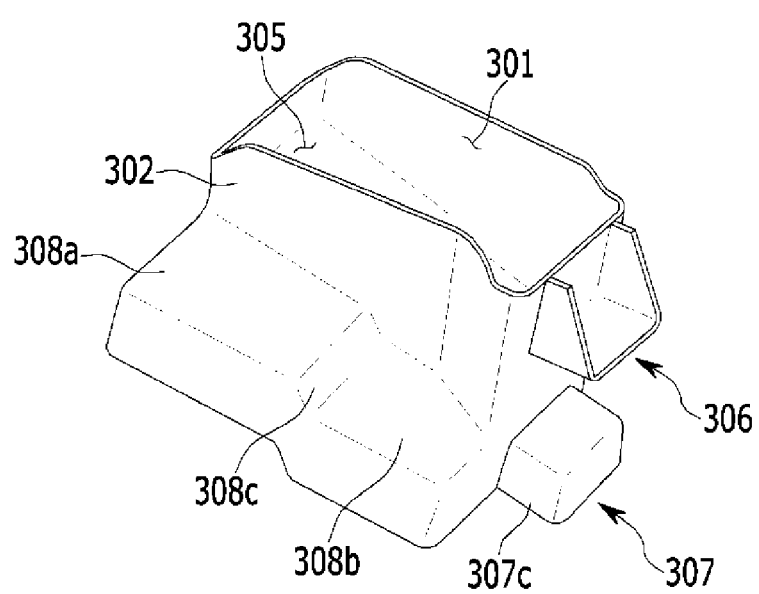
FIG. 3 is a perspective view of the rear shock absorber upper cover according to the exemplary embodiment of the present invention.
Figure 4:
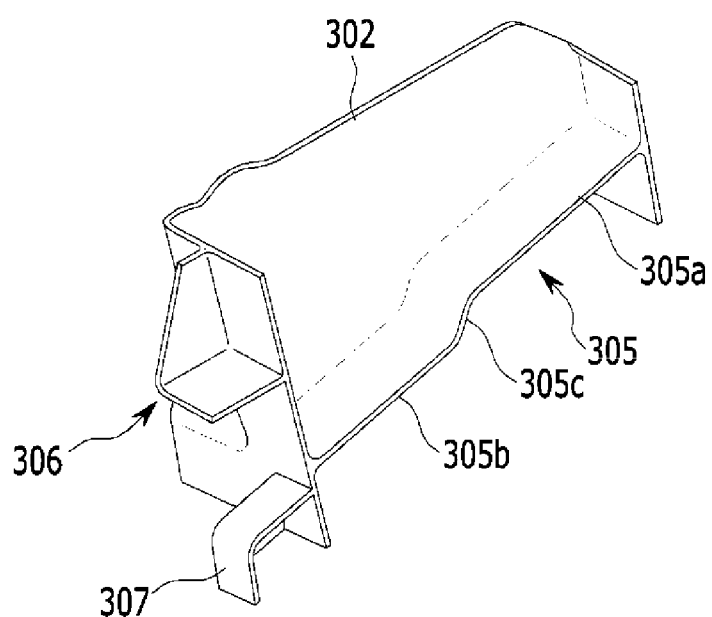
FIG. 4 is a half cross-sectional view of the rear shock absorber upper cover according to the exemplary embodiment of the present invention.

Referring to FIGS. 2 to 4, the rear shock absorber upper cover 30 may have an approximately quadrangular box shape.

When the rear shock absorber upper cover 30 is mounted on the wheel housing 20, the rear shock absorber upper cover 30 may have a front surface 301 that is positioned forward along a longitudinal direction of the vehicle, a rear surface 302 that is positioned rearward, an inner surface 303 that is positioned inward to be oriented toward the vehicle interior along the width direction of the vehicle, and an outer surface 304 that is positioned outward from the vehicle interior.

The front surface 301, the rear surface 302, the inner surface 303, and the outer surface 304 may be integrally connected to each other by a single connection surface 305 that is positioned in the surfaces.

A seat flange 306, which has a shape opened inward along the width direction of the vehicle, may be formed at an upper portion of the inner surface 303 along a height direction of the vehicle.

The seat flange 306 may have an approximately flat bottom surface 306a, and side walls 306b which vertically stand on both edges of the bottom surface 306a, and face each other.

A front end portion of the package tray cross member 40 is inserted from an upper portion to a lower portion along the height direction of the vehicle through the opened space of the seat flange 306, and for example, may be integrally coupled to the seat flange 306 by a welding method.

When the front end portion of the package tray cross member 40 is inserted into and coupled to the seat flange 306, the bottom surface 306a of the seat flange 306 serves to block upward and downward motion of the package tray cross member 40 along the height direction of the vehicle, the two side walls 306b serve to block forward and rearward motion of the package tray cross member 40 along the longitudinal direction of the vehicle, and a part 303a of the inner surface 303, which is enclosed by the two side walls 306b, serves to block left and right motion of the package tray cross member 40 along the width direction of the vehicle.

A coupling protruding portion 307, which protrudes inward to be oriented toward the vehicle interior along the width direction of the vehicle, may be formed at a lower portion of the inner surface 303 along the height direction of the vehicle.

The coupling protruding portion 307 may have an approximately quadrangular box shape.

The coupling protruding portion 307 may have an approximately flat inner surface 307a that protrudes inward to be oriented toward the vehicle interior along the width direction of the vehicle, and a front surface 307b and a rear surface 307c that are formed to be vertically extended outward from the vehicle interior at both edges of the inner surface 307a along the width direction of the vehicle, and the front surface 307b is positioned forward along the longitudinal direction of the vehicle and the rear surface 307c is positioned rearward along the longitudinal direction of the vehicle.

When the inner dual rail member 50 is attached to the inner surface of the wheel housing 20, which is oriented toward the vehicle interior along the width direction of the vehicle, the inner dual rail member 50 may have a first rail 501 which is extended upward and downward in the height direction of the vehicle, and a second rail 502 which is formed to be integrally and obliquely extended forward from the first rail 501 along the longitudinal direction of the vehicle.

That is, the first rail 501 and the second rail 502 form an acute angle.

Flanges 503 having a horizontally bent shape are formed along edges of the first rail 501 and the second rail 502, and the flanges 503 may be attached to the inner surface of the wheel housing 20 by a welding method.

The first rail 501 and the second rail 502 may be formed to be bent so as to have an approximately ' ⊂ ' shaped cross-section 504, respectively.

An upper portion of the first rail 501 of the inner dual rail member 50 is fitted with and coupled to the coupling protruding portion 307 in a manner in which the upper portion of the first rail 501 of the inner dual rail member 50 covers the coupling protruding portion 307.

When the inner dual rail member 50 is fitted with and coupled to the coupling protruding portion 307 as described above, the inner surface 307a of the coupling protruding portion 307 serves to block left and right motion of the inner dual rail member 50 along the width direction of the vehicle, and the front surface 307b and the rear surface 307c of the coupling protruding portion 307 serve to block forward and rearward motion of the inner dual rail member 50 along the longitudinal direction of the vehicle.

Referring to FIGS. 3 and 4, an extending portion may be integrally formed on the rear surface 302 so as to be extended rearward along the longitudinal direction of the vehicle.

The extending portion may include a first extending portion 308a which is positioned at an upper portion thereof along the height direction of the vehicle, a second extending portion 308b which is positioned at a lower portion thereof but lower than the position of the first extending portion 308a along the height direction of the vehicle, and a stepped connection portion 308c which connects the first extending portion 308a and the second extending portion 308b so that a stepped portion is interposed between the first extending portion 308a and the second extending portion 308b.

Figure 6:
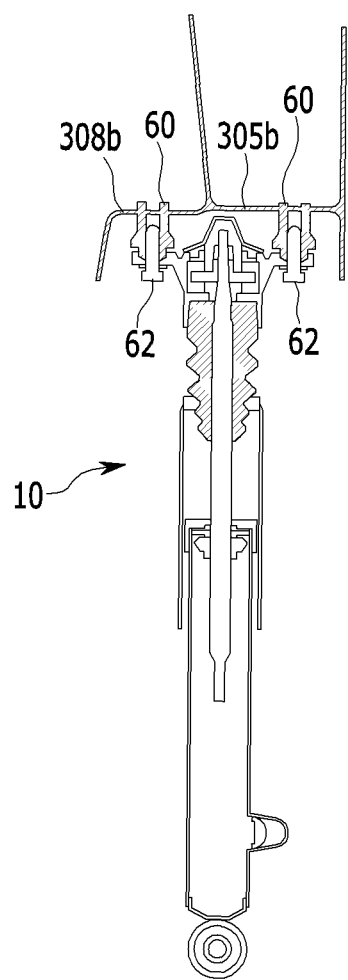
FIG. 6 is a cross-sectional view taken along line A-A of FIG. 5.

As illustrated in FIG. 6, welding nuts 60 are attached to the second extending portion 308b, and the upper portion of the rear shock absorber 10 is engaged with and mounted to the welding nuts 60 by bolts 62.

That is, the second extending portion 308b forms a mounting portion of the rear shock absorber 10.

The connection surface 305 may include an upper connection surface 305a which is positioned at an upper portion thereof along the height direction of the vehicle, a lower connection surface 305b which is positioned at a lower portion thereof but lower than the position of the upper connection surface 305a, and a stepped connection portion 305c which connects the upper connection surface 305a and the lower connection surface 305b so that a stepped portion is interposed between the upper connection surface 305a and the lower connection surface 305b.

Figure 7:
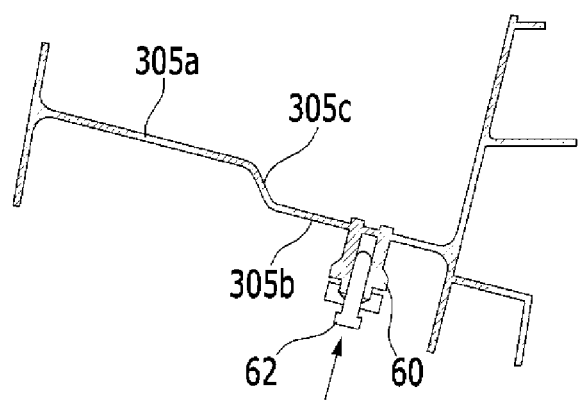
FIG. 7 is a cross-sectional view taken along line B-B of FIG. 5.

As illustrated in FIGS. 6 and 7, a welding nut 60 is attached to the lower connection surface 305b, and the upper portion of the rear shock absorber 10 is engaged with and mounted to the welding nut 60 by a bolt 62.

That is, the lower connection surface 305b forms a mounting portion of the rear shock absorber 10.

As illustrated in FIG. 7, the stepped connection portion 305c serves to firmly support the lower connection surface 305b when a vertical load is applied, as depicted by the arrow, to the lower connection surface 305b through the rear shock absorber 10.

Figure 8:
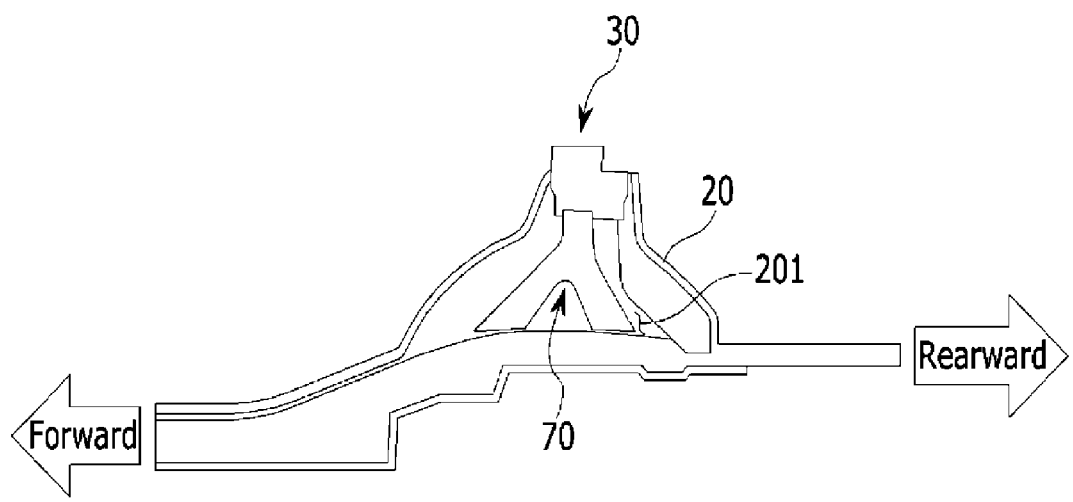
FIG. 8 is a front view illustrating a state in which an outer dual rail member is mounted on a wheel housing in accordance with the exemplary embodiment of the present invention.
Figure 9:
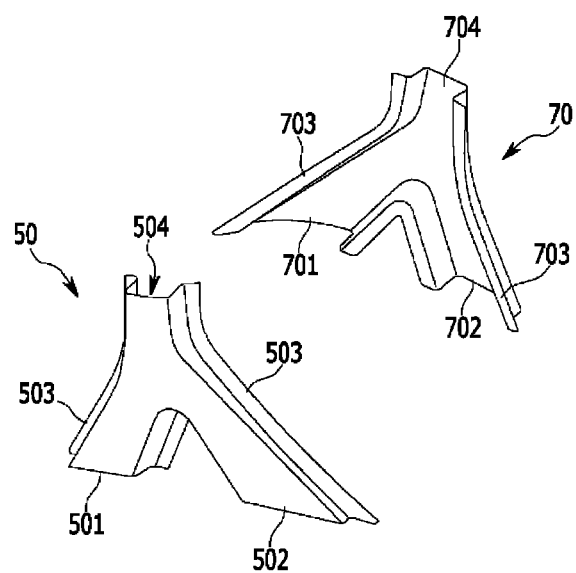
FIG. 9 is a perspective view of the inner dual rail member and the outer dual rail member according to the exemplary embodiment of the present invention.

Referring to FIGS. 8 and 9, an outer dual rail member 70 having a shape approximately identical to the shape of the inner dual rail member 50 is attached to an outer surface 201 of the wheel housing 20, which is positioned outward along the width direction of the vehicle, and serves to increase stiffness of the wheel housing 20.

When the outer dual rail member 70 is attached to the outer surface 201 of the wheel housing 20, the outer dual rail member 70 may have a first rail 701 which is extended upward and downward in the height direction of the vehicle, and a second rail 702 which is formed to be integrally and obliquely extended forward from the first rail 701 along the longitudinal direction of the vehicle.

That is, the first rail 701 and the second rail 702 form an acute angle.

Flanges 703 having a horizontally bent shape are formed along edges of the first rail 701 and the second rail 702, and the flanges 703 may be attached to the outer surface 201 of the wheel housing 20 by a welding method.

The first rail 701 and the second rail 702 may be formed to be bent so as to have an approximately '⊏' shaped cross-section 704, respectively.

When the inner dual rail member 50 is attached to the inner surface of the wheel housing 20, and the outer dual rail member 70 is attached to the outer surface 201 of the wheel housing 20, which is a back surface of the inner surface, the inner dual rail member 50 and the outer dual rail member 70 effectively increase structural stiffness of the wheel housing 20, thereby more firmly support external force which is transmitted from the rear shock absorber 10 to the wheel housing 20.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A rear shock absorber mounting structure for a vehicle, comprising:
    a rear shock absorber upper cover which is mounted on a wheel housing and on which a rear shock absorber is engaged and supported;
    an inner dual rail member which is mounted on an inner surface of the wheel housing, which is oriented toward a vehicle interior along a width direction of the vehicle; and
    an outer dual rail member which is mounted on an outer surface of the wheel housing, which is oriented toward an outside of the vehicle interior along the width direction of the vehicle,
    wherein when the inner dual rail member is attached to the inner surface of the wheel housing, which is oriented toward the vehicle interior along the width direction of the vehicle, the inner dual rail member includes:
        a first rail which is extended upward and downward in the height direction of the vehicle;
        a second rail which is formed to be integrally and obliquely extended forward from the first rail along a longitudinal direction of the vehicle; and
        flanges which are horizontally bent along edges of the first rail and the second rail, and attached to the inner surface of the wheel housing by a welding method.

2. The rear shock absorber mounting structure of claim 1, wherein a part of a lower portion of the rear shock absorber upper cover is inserted into the wheel housing, and attached to the wheel housing by a welding method.

3. The rear shock absorber mounting structure of claim 1, wherein a package tray cross member, which is formed to be extended along the width direction of the vehicle, is seated on and coupled to the rear shock absorber upper cover.

4. The rear shock absorber mounting structure of claim 3, wherein the rear shock absorber upper cover has a quadrangular box shape.

5. The rear shock absorber mounting structure of claim 4, wherein when the rear shock absorber upper cover is mounted on the wheel housing, the rear shock absorber upper cover includes:
    a front surface which is positioned forward along the longitudinal direction of the vehicle;
    a rear surface which is positioned rearward along the longitudinal direction of the vehicle;

an inner surface which is positioned inward to be oriented toward the vehicle interior along the width direction of the vehicle;

an outer surface which is positioned outward from the vehicle interior along the width direction of the vehicle; and a connection surface which integrally connects the front surface, the rear surface, the inner surface, and the outer surface.

6. The rear shock absorber mounting structure of claim 5, wherein a seat flange, which has a shape that is opened inward along the width direction of the vehicle to be oriented toward an inner side of the vehicle interior, is formed at an upper portion of the inner surface along a height direction of the vehicle, and wherein the package tray cross member is seated on and coupled to the seat flange.

7. The rear shock absorber mounting structure of claim 6, wherein the seat flange includes:

a flat bottom surface protruding inward along the width direction of the vehicle; and side walls which vertically stand on both edges of the bottom surface, face each other, and are coupled to the inner surface of the rear shock absorber upper cover.

8. The rear shock absorber mounting structure of claim 5, wherein a coupling protruding portion, which protrudes inward to be oriented toward the vehicle interior along the width direction of the vehicle, is formed at a lower portion of the inner surface along the height direction of the vehicle, and the inner dual rail member is fitted with and coupled to the coupling protruding portion.

9. The rear shock absorber mounting structure of claim 8, wherein the coupling protruding portion has a quadrangular box shape.

10. The rear shock absorber mounting structure of claim 9, wherein the coupling protruding portion includes:

an inner surface which protrudes inward to be oriented toward the vehicle interior along the width direction of the vehicle; and a front surface and a rear surface which are formed to be vertically extended outward from the vehicle interior at both edges of the inner surface along the width direction of the vehicle and coupled to the inner surface of the rear shock absorber upper cover, wherein the front surface is positioned forward along the longitudinal direction of the vehicle and the rear surface is positioned rearward along the longitudinal direction of the vehicle.

11. The rear shock absorber mounting structure of claim 5, wherein an extending portion is integrally formed on the rear surface so as to be extended rearward along the longitudinal direction of the vehicle, and, wherein the extending portion includes:

a first extending portion which is positioned at an upper portion thereof along the height direction of the vehicle;

a second extending portion which is positioned at a lower portion thereof but lower than the first extending portion along the height direction of the vehicle; and a stepped connection portion which connects the first extending portion and the second extending portion so that a stepped portion is interposed between the first extending portion and the second extending portion, and wherein the upper portion of the rear shock absorber is engaged with and mounted to the second extending portion.

12. The rear shock absorber mounting structure of claim 5, wherein the connection surface includes:

an upper connection surface which is positioned at an upper portion thereof along the height direction of the vehicle;

a lower connection surface which is positioned at a lower portion thereof but lower than the position of the upper connection surface; and a stepped connection portion which connects the upper connection surface and the lower connection surface so that a stepped portion is interposed between the upper connection surface and the lower connection surface, and the upper portion of the rear shock absorber is engaged with and mounted to the lower connection surface.

13. The rear shock absorber mounting structure of claim 1, wherein the first rail and the second rail form an acute angle.

14. The rear shock absorber mounting structure of claim 13, wherein the first rail and the second rail are formed to be bent so as to have a '⊂' shaped cross-section, respectively.

15. The rear shock absorber mounting structure of claim 1, wherein when the outer dual rail member is attached to the outer surface of the wheel housing, which is oriented toward an outside of the vehicle interior along the width direction of the vehicle, the outer dual rail member includes:

a first rail which is extended upward and downward in the height direction of the vehicle;

a second rail which is formed to be integrally and obliquely extended forward from the first rail along the longitudinal direction of the vehicle; and flanges which are horizontally bent along edges of the first rail and the second rail, and attached to the outer surface of the wheel housing by a welding method.

16. The rear shock absorber mounting structure of claim 15, wherein the first rail and the second rail form an acute angle.

17. The rear shock absorber mounting structure of claim 16, wherein the first rail and the second rail are formed to be bent so as to have a '⊂' shaped cross-section, respectively.

18. A rear shock absorber mounting structure for a vehicle, comprising:

a rear shock absorber upper cover which is mounted on a wheel housing and on which a rear shock absorber is engaged and supported;

an inner dual rail member which is mounted on an inner surface of the wheel housing, which is oriented toward a vehicle interior along a width direction of the vehicle; and an outer dual rail member which is mounted on an outer surface of the wheel housing, which is oriented toward an outside of the vehicle interior along the width direction of the vehicle, wherein a package tray cross member, which is formed to be extended along the width direction of the vehicle, is seated on and coupled to the rear shock absorber upper cover.

19. A rear shock absorber mounting structure for a vehicle, comprising:

a rear shock absorber upper cover which is mounted on a wheel housing and on which a rear shock absorber is engaged and supported;

an inner dual rail member which is mounted on an inner surface of the wheel housing, which is oriented toward a vehicle interior along a width direction of the vehicle; and an outer dual rail member which is mounted on an outer surface of the wheel housing, which is oriented toward an outside of the vehicle interior along the width direction of the vehicle, wherein when the outer dual rail member is attached to the outer surface of the wheel housing, which is oriented toward an outside of the vehicle interior along the width direction of the vehicle, the outer dual rail member includes:

a first rail which is extended upward and downward in the height direction of the vehicle;

a second rail which is formed to be integrally and obliquely extended forward from the first rail along the longitudinal direction of the vehicle; and flanges which are horizontally bent along edges of the first rail and the second rail, and attached to the outer surface of the wheel housing by a welding method.

* * * * *